May 14, 1957   J. H. DRILLICK ET AL   2,792,275
RECORDING SCALES
Filed Aug. 10, 1953   13 Sheets-Sheet 1

INVENTORS
John H. Drillick
William B. Floyd
John Halahan
BY Theodore F. Aronson
Floyd A. Lyon

ATTORNEYS

INVENTORS
John H. Drillick
William B. Floyd
BY John Halahan
Theodore F. Aronson
Floyd A. Lyon

ATTORNEYS.

May 14, 1957  J. H. DRILLICK ET AL  2,792,275
RECORDING SCALES
Filed Aug. 10, 1953  13 Sheets-Sheet 4

INVENTORS
John H. Drillick
William B. Floyd
John Halahan
Theodore F. Aronson
Floyd A. Lyon
BY
ATTORNEYS.

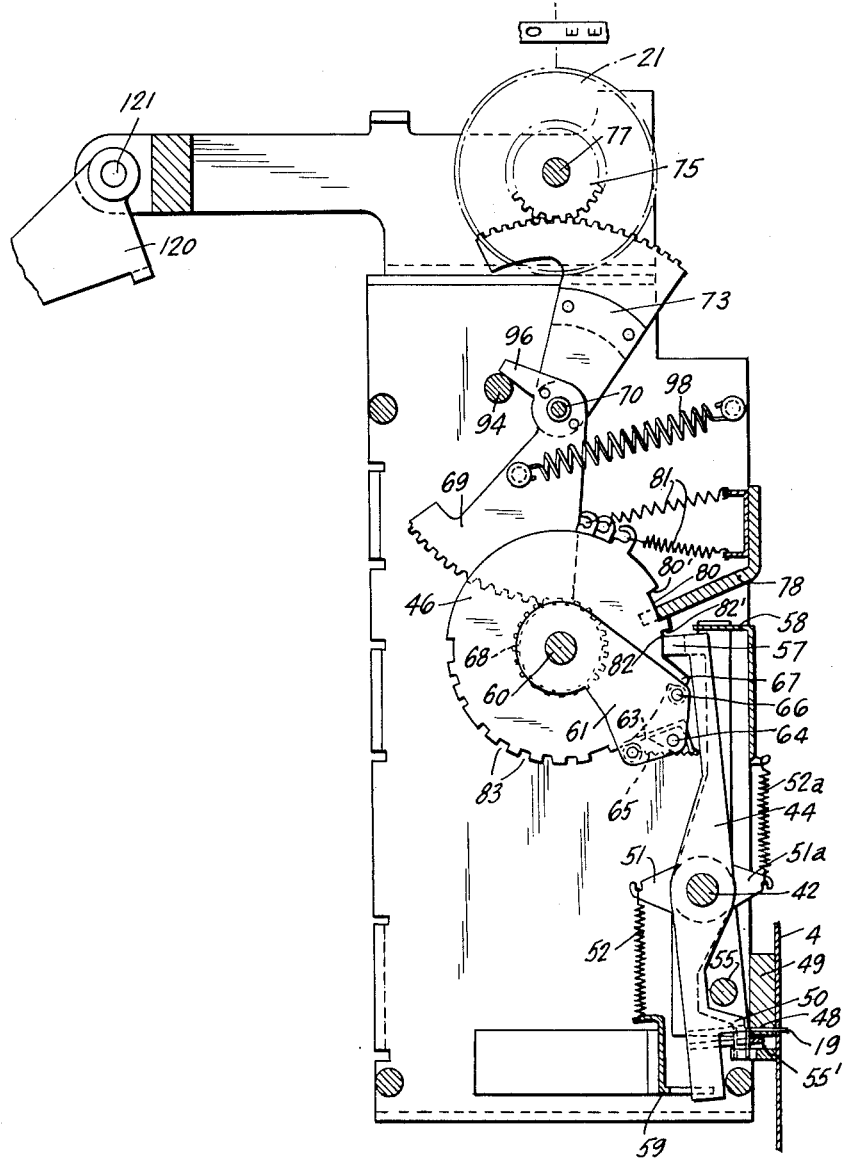

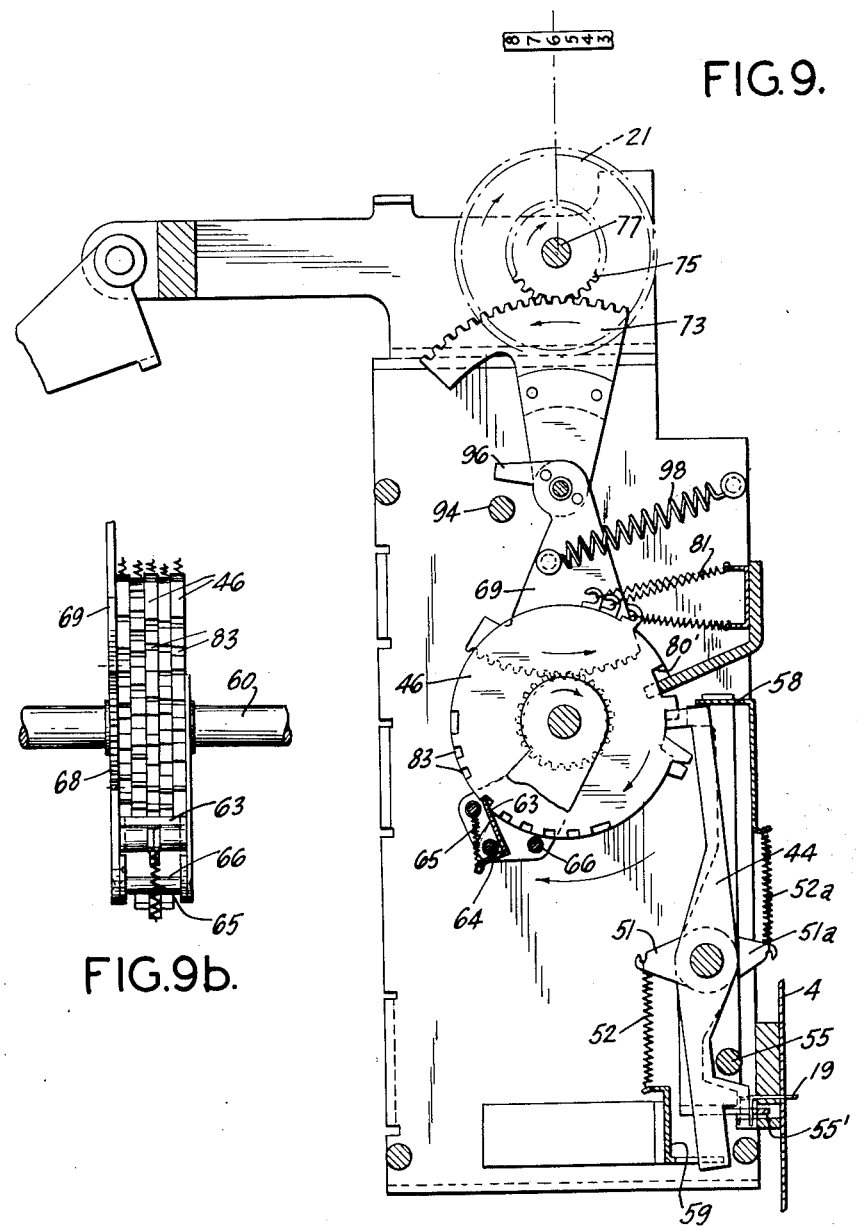

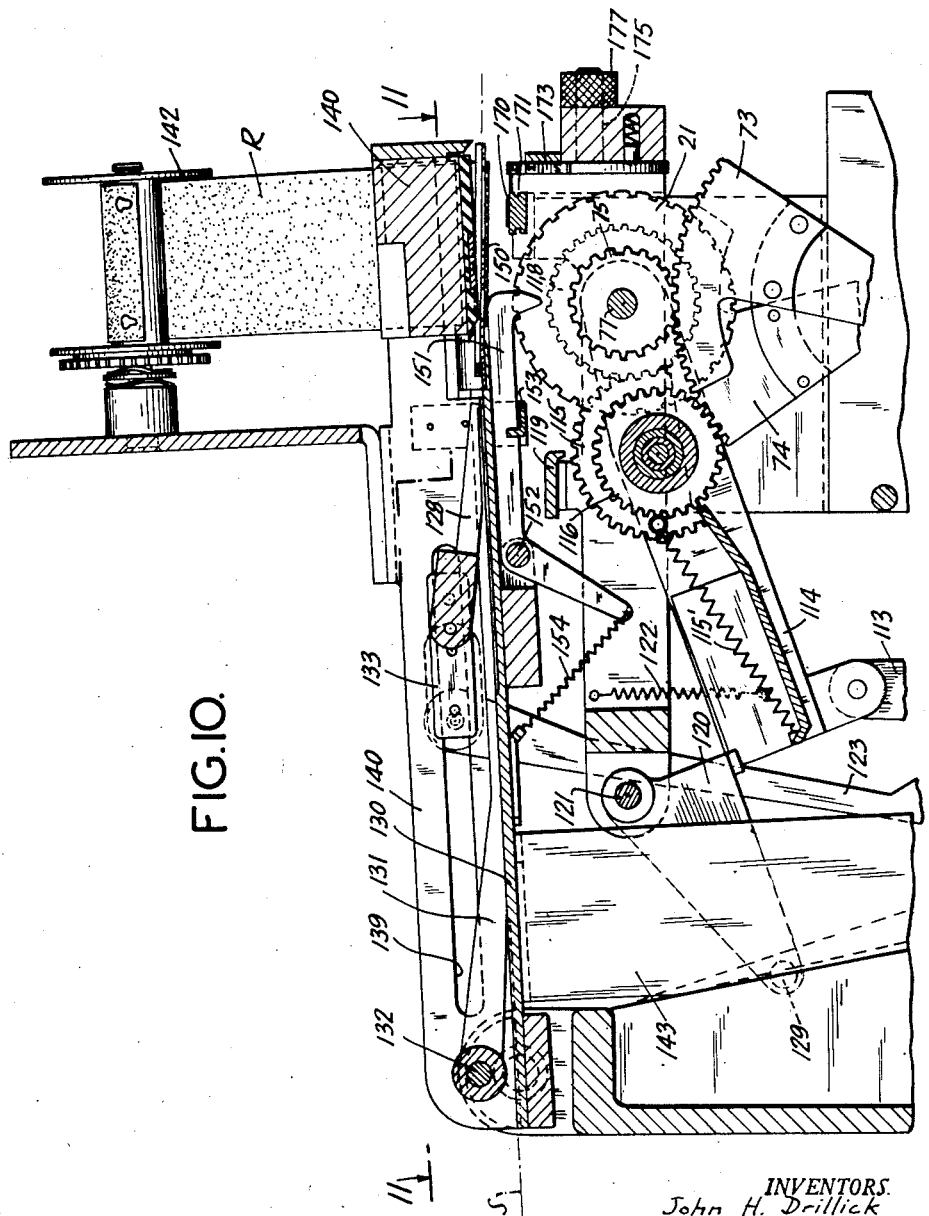

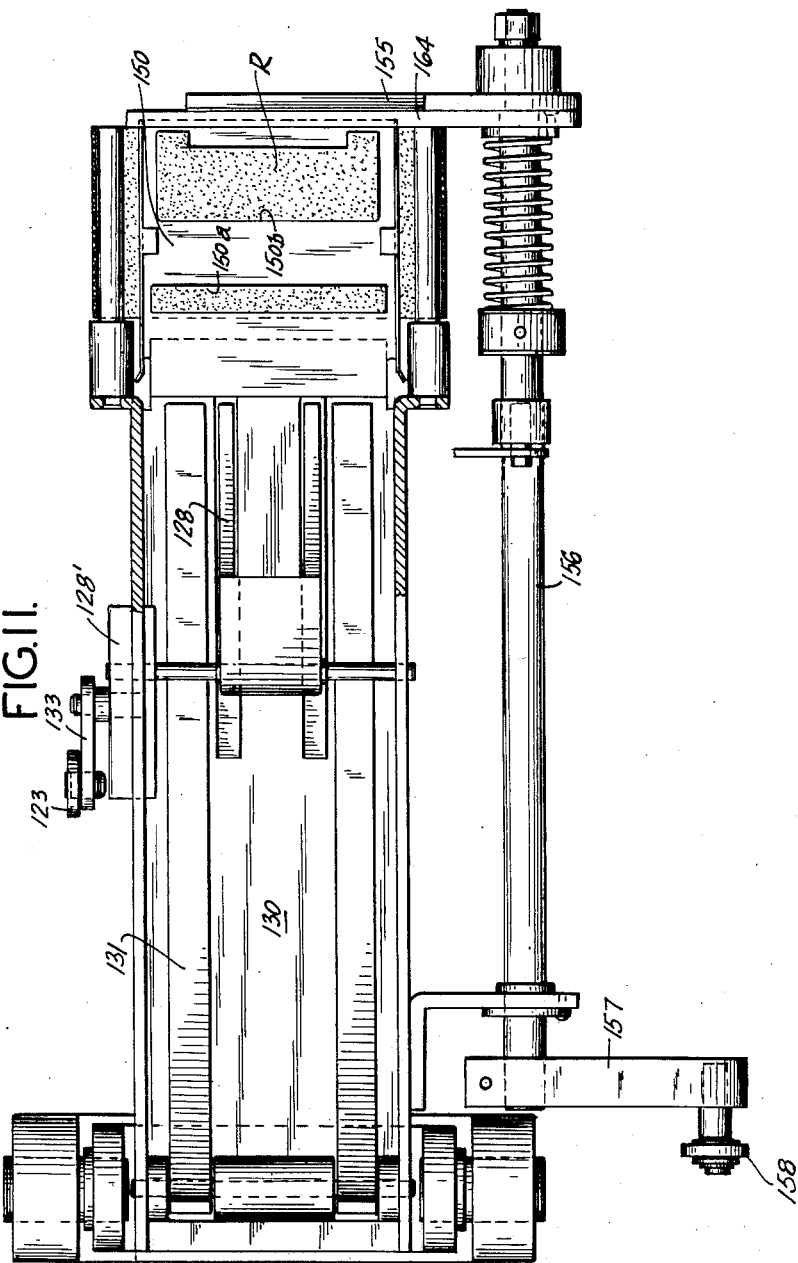

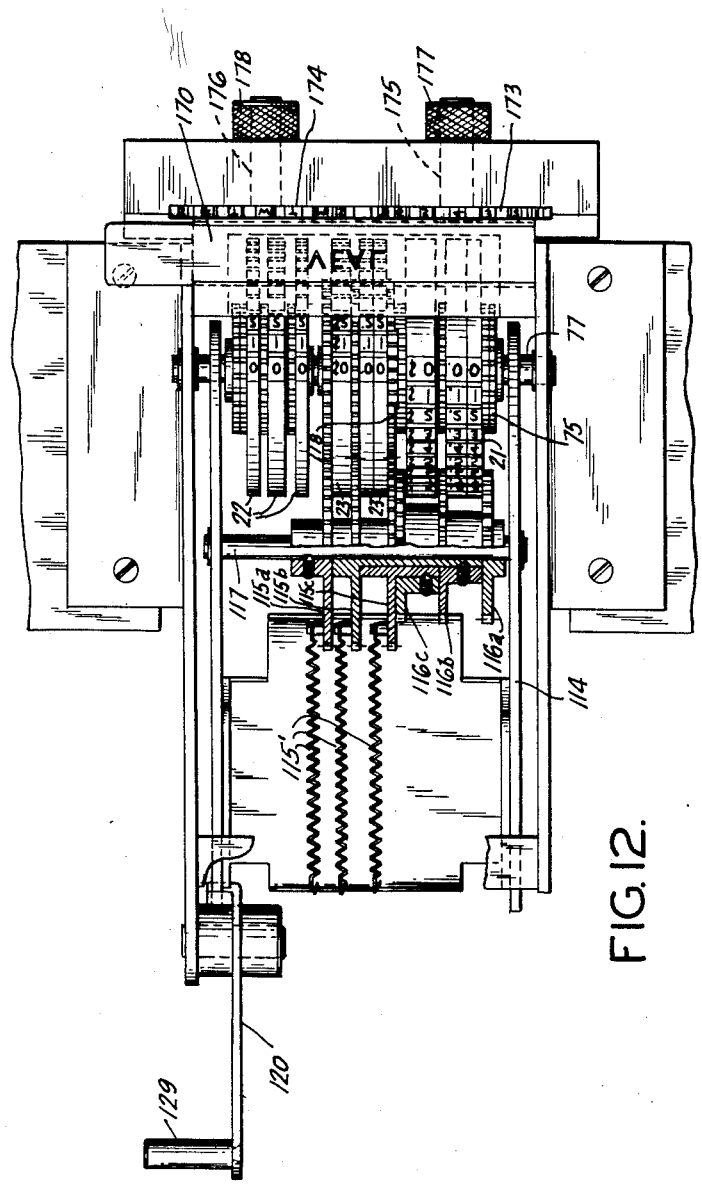

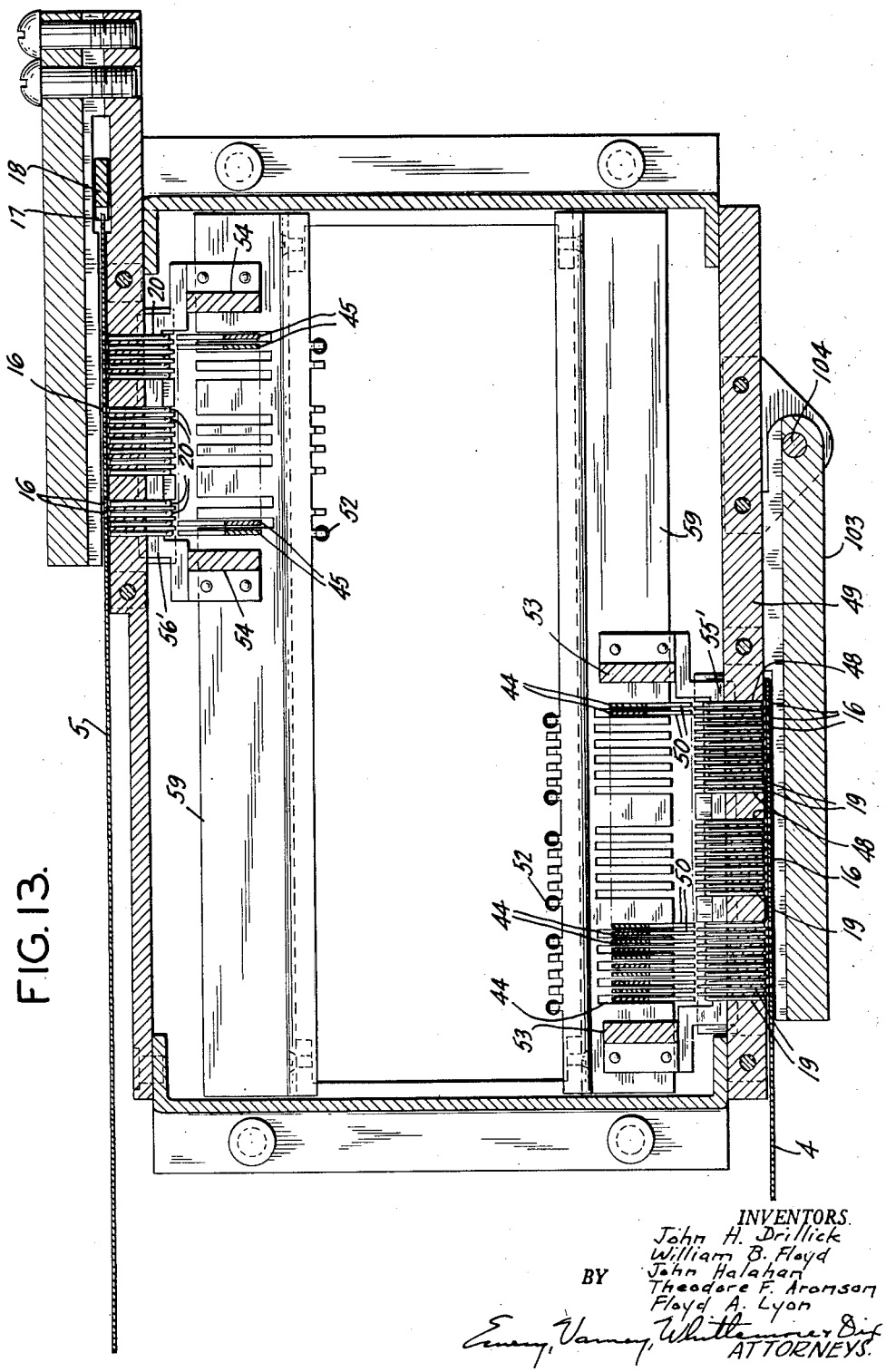

United States Patent Office 2,792,275
Patented May 14, 1957

2,792,275

RECORDING SCALES

John H. Drillick, New York, N. Y., William B. Floyd, Ithan, Pa., and John Halahan, Brookville, Theodore F. Aronson, Valley Stream, and Floyd A. Lyon, Brookville, N. Y., assignors to A. Kimball Company, New York, N. Y., a corporation of New York Application August 10, 1953, Serial No. 373,352

9 Claims. (Cl. 346—10)

This invention relates to recording scales and pertains particularly to a mechanism which, in the process of weighing an article, may be caused to print the weight of the article and the total price of the article computed at a given price per unit of weight. If desired, the mechanism may also print additional data such as the price per unit of weight at which the total price is computed, the name of the article, date, etc.

It is an object of the present invention to provide a mechanism which may be attached to or form a part of any one of several known types of scales, such as used in retail establishments to weigh articles such as meat, for example, which are sold by the pound. It is particularly well adapted for use in establishments which "pre-package" articles for sale. That is, in the case of meat, for example, various cuts such as chops, steaks, roasts, are prepared, wrapped, weighed and labeled before being placed on sale in a retail store.

Among the requirements of recording scales may be mentioned the following. The computing and recording mechanism must not put a load on the weighing mechanism which is sufficient to interfere with accuracy. It must be capable of recording small increments of weight and capable of computing and recording accurately a total cost for each increment of weight. It must operate with reasonable rapidity, eliminate all human calculation and, insofar as possible, all human error. The printed record must be clear and legible. It is an object of the present invention to meet these requirements.

Other objects and advantages of the invention will appear hereinafter.

A preferred embodiment of the invention selected for purposes of illustration is shown in the accompanying drawings, in which, Fig. 1 is a top plan view of the scale, with certain cover parts removed from this and subsequent figures to better disclose the operating parts of the mechanism.

Fig. 8 is an enlarged section on the line 8—8 of Fig. 7, showing the train of print wheel setting parts in rest position.

Fig. 9 is a similar view showing the parts in the "6" position.

Fig. 9B is a rear elevation of the permutation disks shown in the positions of Fig. 9.

Fig. 10 is an enlarged section of the upper portion of the line 2—2 of Fig. 1.

Fig. 11 is a section on the line 11—11 of Fig. 10.

Fig. 12 is a top plan view of the printing wheels with the platen frame and associated parts removed.

Fig. 13 is an enlarged section on the line 13—13 of Fig. 5.

According to the present invention one or more groups of printing wheels are mounted in position to cooperate with a platen across which may be fed the paper on which the record is to be printed. Each group of printing wheels is provided with a series of printing numerals or characters, and a sufficient number of wheels is provided in each group to print the desired number of digits which together represent a total value. Thus, for example, for printing a record of weight, a group of printing wheels might consist of three separate wheels, one for pounds, one for ounces, and one for fractions of an ounce. If the "pounds" wheel is turned to a position to print the numeral "2," the "ounces" wheel to print the numeral "12" and the fractional wheel to print the numeral "½," these numerals taken together would represent a total value of 2 pounds 12½ ounces. Similarly another group of printing wheels consisting of three separate wheels may be provided to record total cost. If a "dollars" wheel is turned to a position to print the numeral "3," a "dimes" wheel is turned to print the numeral "9" and a "pennies" wheel is turned to print the numeral "7," the numerals taken together would represent a total value of $3.97.

An indicator member is provided to control each of said groups of printing wheels. Each indicator member is connected to the scale mechanism to move therewith in such manner that the movement of the indicator members is proportional to the movement of the scale which is occasioned by placing a weight thereon. If desired, one of the indicator members may carry a printed scale which may be read visually by the operator, but for purposes of this invention, each indicator member is provided with a plurality of separate groups of code perforations equal in number to the number of printing wheels of the group controlled thereby. Each group of code perforations consists of a series of lines of perforations, with each line containing a combination of code perforations which, taken together, represents a digit. Each of the lines of perforations of each group of code perforations is sensed by a separate group of sensing pins. The information sensed by each group of sensing pins is then used separately to control separately the setting of each of said printing wheels.

In the preferred embodiment of the invention illustrated herein, the indicator members are in the form of disks, the separate groups of code perforations are arranged in concentric annular areas, and the lines of perforations of all groups extend radially.

Figure 1:
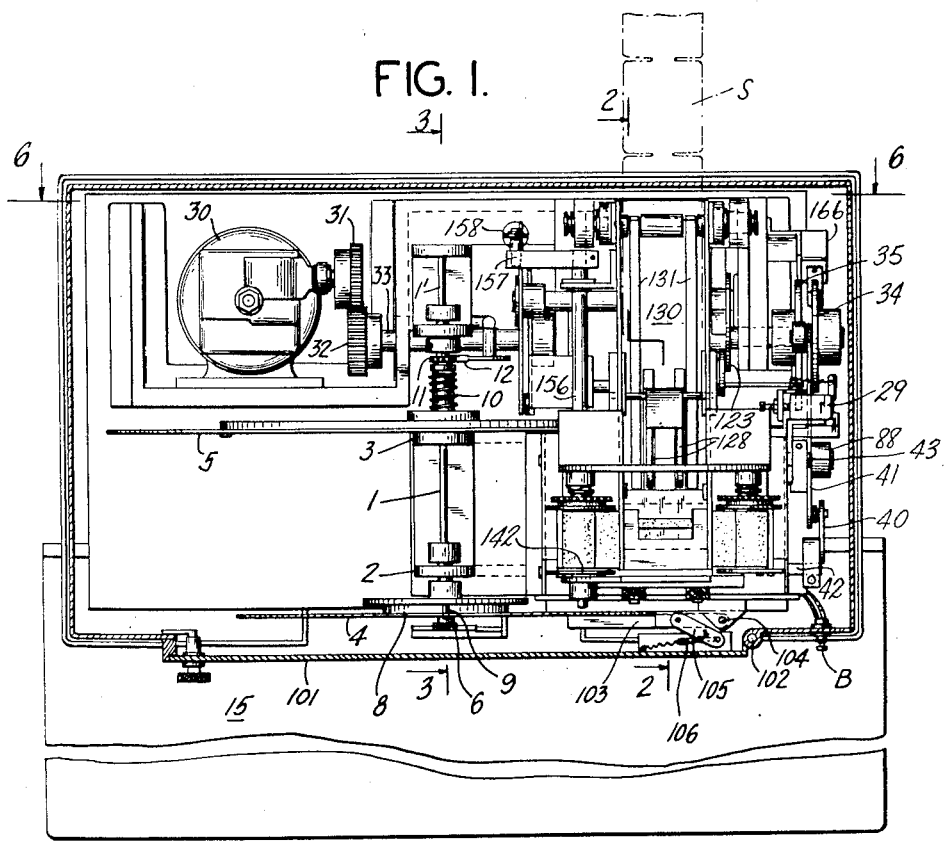
Figure 5:
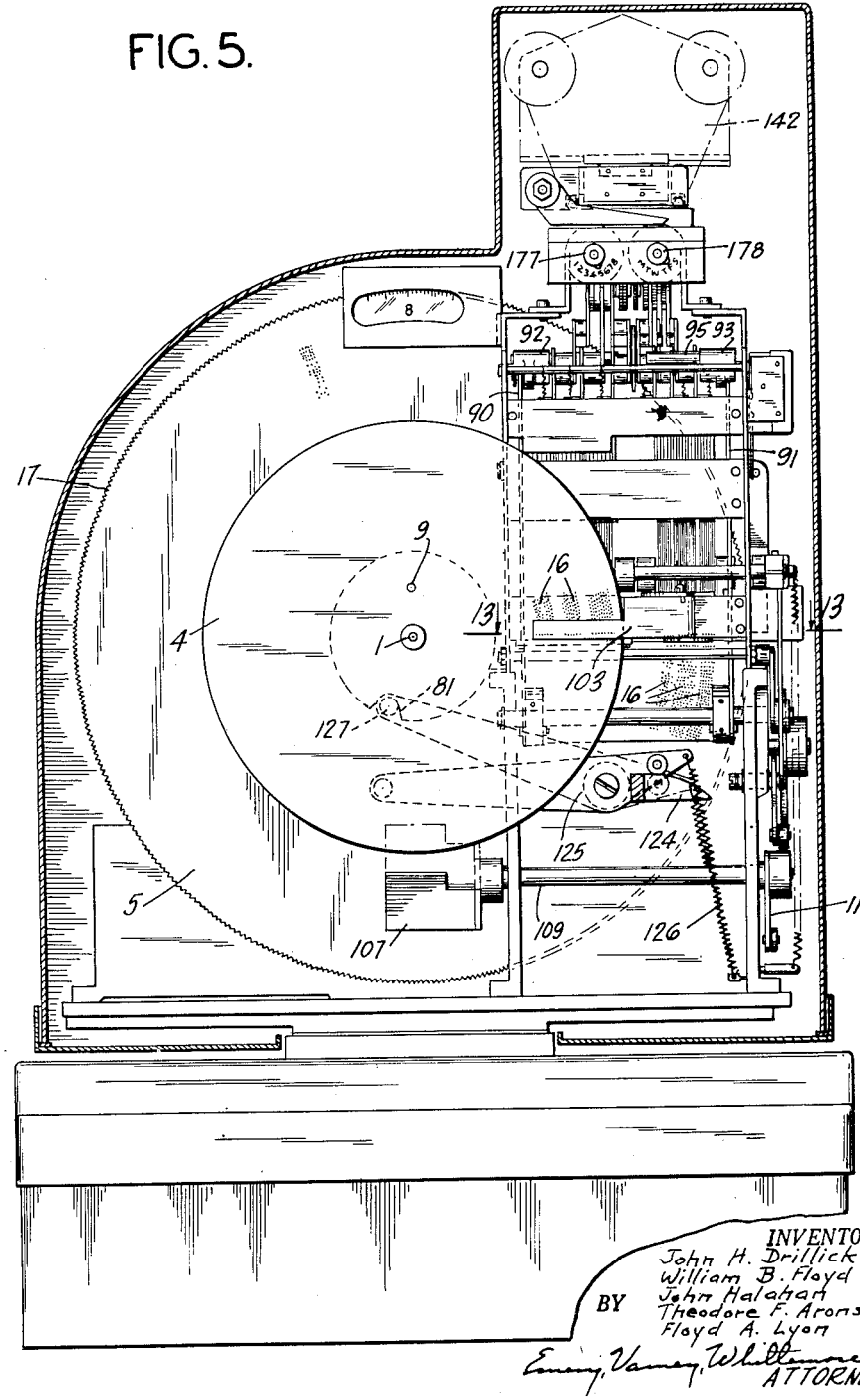
Fig. 5 is a front elevation, partly in section.
Figure 6:
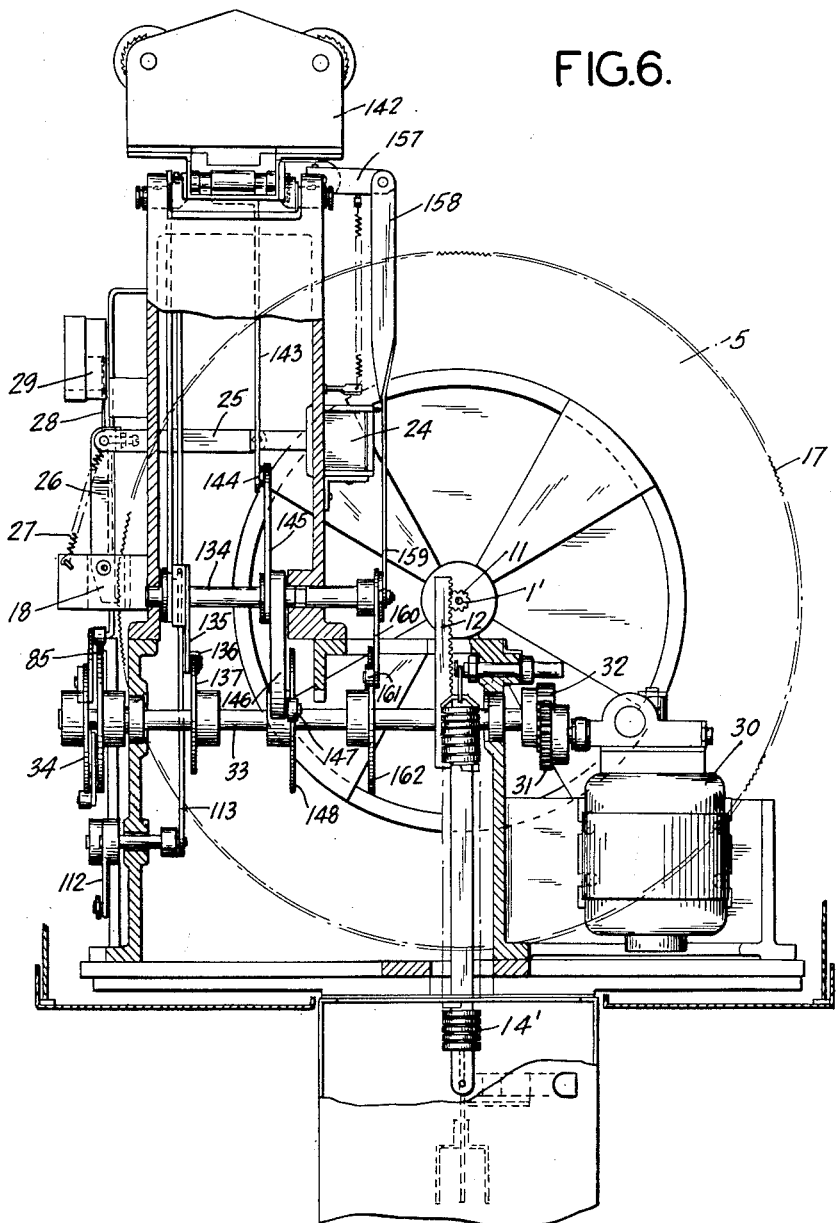
Fig. 6 is a section on the line 6—6 of Fig. 1.

The basic scheme of the machine may be seen in Figs. 1, 5 and 6. A spindle 1, mounted in bearings 2 and 3, carries an indicator member in the form of a disk 4 on its outer or front end and another indicator member, a disk 5, spaced rearwardly therefrom. Disk 5 is permanently secured to the spindle, but disk 4 is removable, being held in fixed position on the spindle by a knurled nut 6 which clamps the disk against sleeve 7. Flanged disk 8, mounted on sleeve 7 carries a forwardly projecting pin 9 which enters a locating hole in disk 4 which fixes the disk in proper position relative to the spindle.

Spindle 1 has an extension 1' mounted coaxially therewith which carries a small pinion gear 11 which meshes with the teeth of rack 12 which is connected by links 13 to the operating beam 14 of the scale. When an article is placed on the platform 15 of the scale, reciprocating movement of the beam against the tension of spring 14' is thus translated into proportional angular movement of the disks 4 and 5, and when the platform and disks come to rest, the angular displacement of the disks from their rest position will indicate the weight of the article.

The spindle 1 and its extension 1' are connected by a scissors spring 10 of conventional construction so that the spindles normally rotate together. The spring is useful, however, to prevent damage to the disks or to the computing and recording mechanism if a weight is added to or removed from the weighing platform after the disks 4 and 5 are locked during the continuance of an operating cycle as hereinafter described. This is of importance in the practical operation of the machine for it makes it possible for the operator, as soon as the operating cycle has started and the disks are locked, to remove the article or package from the platform and to place the next article thereon while the operating cycle continues, so that as soon as one cycle is completed, another cycle may be started.

Figure 14:
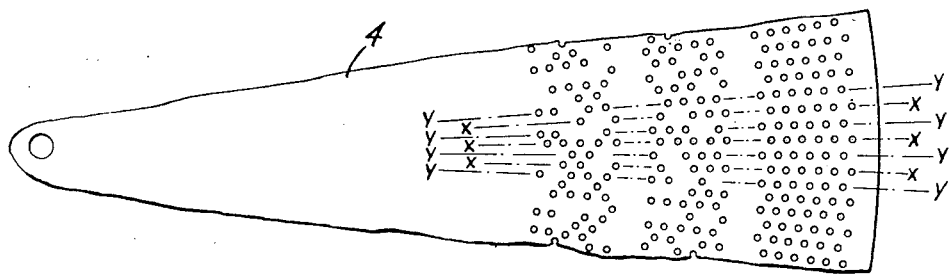
Fig. 14 is a front elevation of a segment of one of the price disks.

The disks are provided with code perforations 16 which, as shown in Figs. 5 and 14, are arranged in three concentric annular areas. The perforations are also arranged in radial lines, with the perforations of each radial line arranged in a code pattern to represent certain numerals as hereinafter explained.

The periphery of the disk 5 is provided with a series of equally spaced notches 1 adapted 7 to be engaged by a latch 18, as hereinafter explained, to lock the disks and spindle in fixed position during the remainder of the operating cycle. While the disks are thus locked, two sets of sensing pins 19 and 20, each consisting of three groups, are caused to engage the disks 4 and 5, respectively, in the regions of the three concentric annular areas. The combinations of pins which find and enter the perforations of disks 4 and 5 control the setting of two series of printing wheels 21, 22, each consisting of three wheels, which print total cost and weight information, respectively, on labels which are fed through the machine, face down, above the printing wheels and below the printing platen, as hereinafter described.

Sensing pins 19 also control the setting of a third series of printing wheels 23 which print the price per unit of weight at which the total cost is computed. The number of printing wheels of each series 21, 22 and 23 will depend on the nature of the scale, the range of weights and the range of prices to be accommodated. In the scale illustrated, it is assumed that the range of weight is from 0 to 16 pounds and that within this range it is sufficient to record increment of ¼ oz. It is also assumed that the range of prices per pound will not exceed three digits and that it is not necessary to record fractions of a cent. Therefore, in series 22, three printing wheels are required, one to print numerals representing pounds, one to print numerals representing ounces, and one to print numerals representing quarter ounces. Likewise in series 21 and 23, three printing wheels are required, one to print numerals representing hundreds (dollars), one to print numerals representing tens (dimes), and one to print numerals representing units (cents). Thus, for example, if the article which is being weighed weighs four pounds ten and one quarter ounces, and if the price per pound is sixty-four cents, the printing wheels 22 will print the numerals 4, 10 and ¼ in adjacent columns of the label, near which, if desired, may be printed the heading "Weight." The printing wheels 23 will print the numerals 6 and 4 near by near an appropriate heading such as "Price per pound." The printing wheels 21 will print the numerals 2, 9 and 7 under an appropriate heading such as "Total cost."

Each printing wheel has a "blank" position (Fig. 8) in which there is no numeral or other character, as well as a "0" position in which the "0" numeral is found. The "blank" position is the normal rest position of the printing wheels at the beginning of the operating cycle, and each wheel moves to the "0" position if all of the sensing pins of the group which controls it fail to find perforations in the disk.

Every position of each printing wheel except the "blank" position which is not required for a printing numeral or character is filled with the character "E," which indicates an error in any printed column in which it appears.

Disk 5 is somewhat larger than disk 4 and it can be permanently fixed to the spindle because it is possible within the area of the disk to place sufficient lines of perforations to represent reasonably small increments of weight. If, for example, the notches of the disk are spaced to represent increments of ¼ oz., and if the perforations of a given radial line indicate 3 lbs., 4½ oz., the next adjacent lines will indicate 3 lbs. 4¼ oz. and 3 lbs., 4¾ oz., respectively. When the disk is locked in these positions, the labels will be so printed.

In disk 4, however, it is possible to place lines of perforations on a single disk to represent costs calculated for one price per pound only. That is, if the price of the articles being weighed is $.64 per pound, each radial line will contain perforations representing the calculated total cost for that weight at that price per pound but not at any other price per pound. It is necessary, therefore, to replace the disk 4 with a different disk whenever there is a change in the price per pound of the articles being weighed.

In practice, each machine will be supplied with a series of price disks 4, each having perforations in radial line locations computed for a different price per pound. In weighing articles which are to be sold at any given price per pound, the operator will select the proper disk for that rate and mount it on the spindle 1. As hereinafter explained, the first cycle of operation of the machine thereafter will set the price per pound printing wheels 23 to indicate and print the selected price per pound, and said wheels will remain set until a different price disk is mounted on the spindle, at which time the next succeeding cycle of operation will reset the price per pound printing wheels 23 to indicate the new price.

The locking latch 18 is operated by solenoid 24 through link 25 and arm 26. The solenoid is normally energized to hold the latch out of engagement with the disk against the tension of spring 27. When the starter button B is pressed by the operator after the scale had come to rest, the solenoid is de-energized to permit the latch to swing against the disk under the influence of spring 27 to lock the disks and spindle 1. The operation of the latch also moves arm 28 to close a switch 29 to start the motor 30. The arrangement of the latch 18 and arm 28 is such that if for any reason the latch fails to drop into one of the notches 17 when the solenoid is de-energized, the switch 29 will remain open and the mechanism will not operate. When switch 29 closes, however, motor 30 drives gear 31 which meshes with gear 32 on shaft 33 which is the main shaft of the machine.

Figure 4:
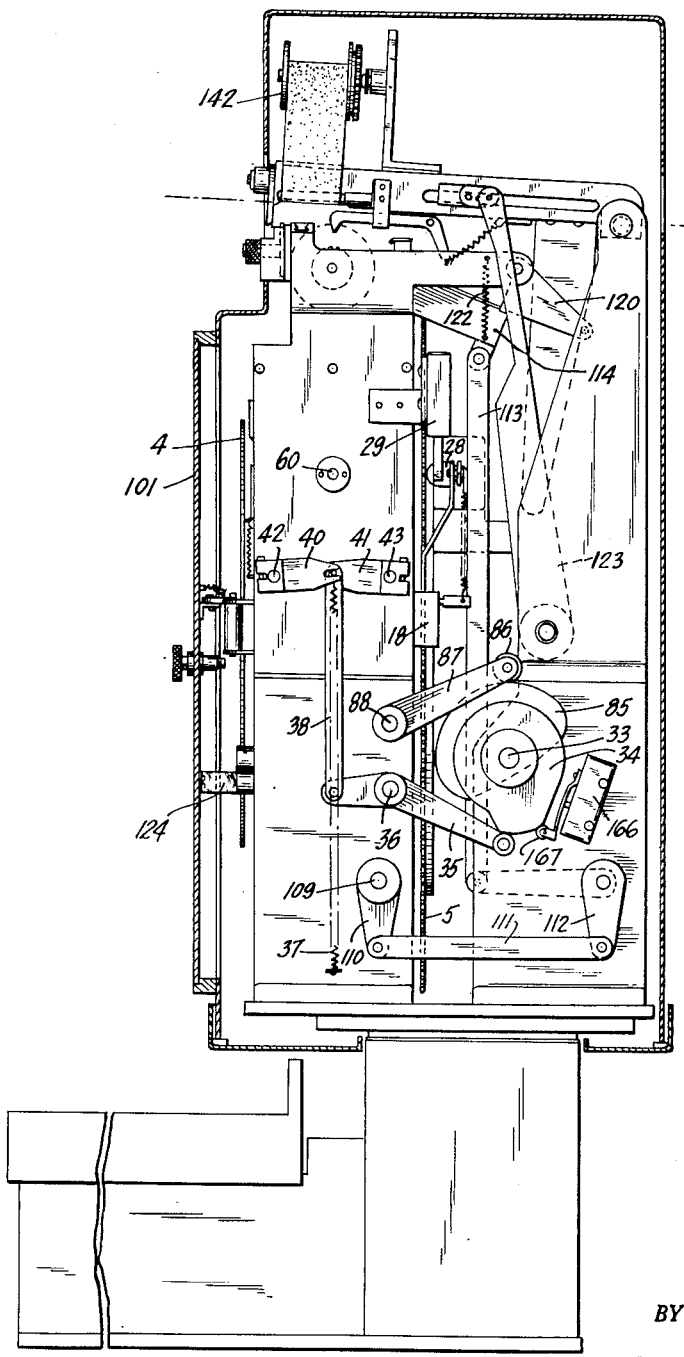
Fig. 4 is an end elevation, partly in section.

The two sets of sensing pins 19 and 20 are mounted within a housing located in the space between the disks 4 and 5. They are normally retracted out of the path of the disks so that they do not interfere with the rotation of the disks as the scale is coming to rest. As soon as the shaft 33 begins to rotate, however, cam 34 allows the bell crank 35 to turn counterclockwise on its pivot 36, Fig. 4, under the influence of spring 37. This movement draws link 38 downward to rock the arms 40, 41 on their respective spindles 42, 43. These spindles carry separate series of pawls 44, 45 which are in position to engage two separate series of permutation disks 46, 47, respectively, there being at least one pawl for each permutation disk of each series, and in the case of series 46, there are two pawls and two sensing pins for each permutation disk for a reason hereinafter described. Since the operation of series 44 is representative of all, Figs. 8 and 9 will be referred to to describe this operation. As shown therein, each of the sensing pins 19 is L-shaped, having a horizontal leg extending through passages 48 in the bar 49 and having a depending vertical leg lying in front of the detent 50 on the pawl. Each pawl has an ear 51 or 51a to which is connected a spring 52 or 52a tending to swing the pawl in counterclockwise direction.

The spindles 42, 43 also carry bails 53, 54 which carry transverse rods 55, 56 and bars 55′, 56′. Normally the rod 55 engages the pawls to hold the fingers 57 at the upper ends of the pawls out of engagement with the permutation disks. Also the bar 55′ engages the vertical legs of the sensing pins to retract them from sensing position. Rocking motion of the spindle 42, however, swings the bails away from the pawls so that in any case where a sensing pin has passed through an aperture in the disk, the finger 57 of the corresponding pawl will move to engage the corresponding permutation disk to control its movement as hereinafter described. In any case where a sensing pin fails to find an aperture in the disk, the corresponding pawl is prevented from engaging the permutation disk. The pawls are guided at top or bottom by fixed combs 58 and 59 having slots in their edges to receive the depending ends of some of the pawls or the upwardly projecting ends of other pawls. Preferably alternate pawls are guided at top and bottom, respectively.

Both sets of permutation disks are mounted on shaft 60 and each of the sets of permutation disks is divided into groups, with a sufficient number of disks in each group to provide the necessary combinations for the desired number of digit positions. Thus, referring to Fig. 7, in the machine illustrtaed, the set of disks 47 which registers weight is divided into three groups, one of which has four disks, one of which has seven disks and one of which has five disks. The right hand group of five disks is intended to register pounds, for example, and five permutation disks are necessary to provide an ample number of digit positions within the capacity of the scale. The middle group is intended to register ounces and since fifteen positions are required, seven disks are necessary. The left hand group is adapted to register quarter ounces and four disks are adequate to provide the necessary positions.

Figure 7:
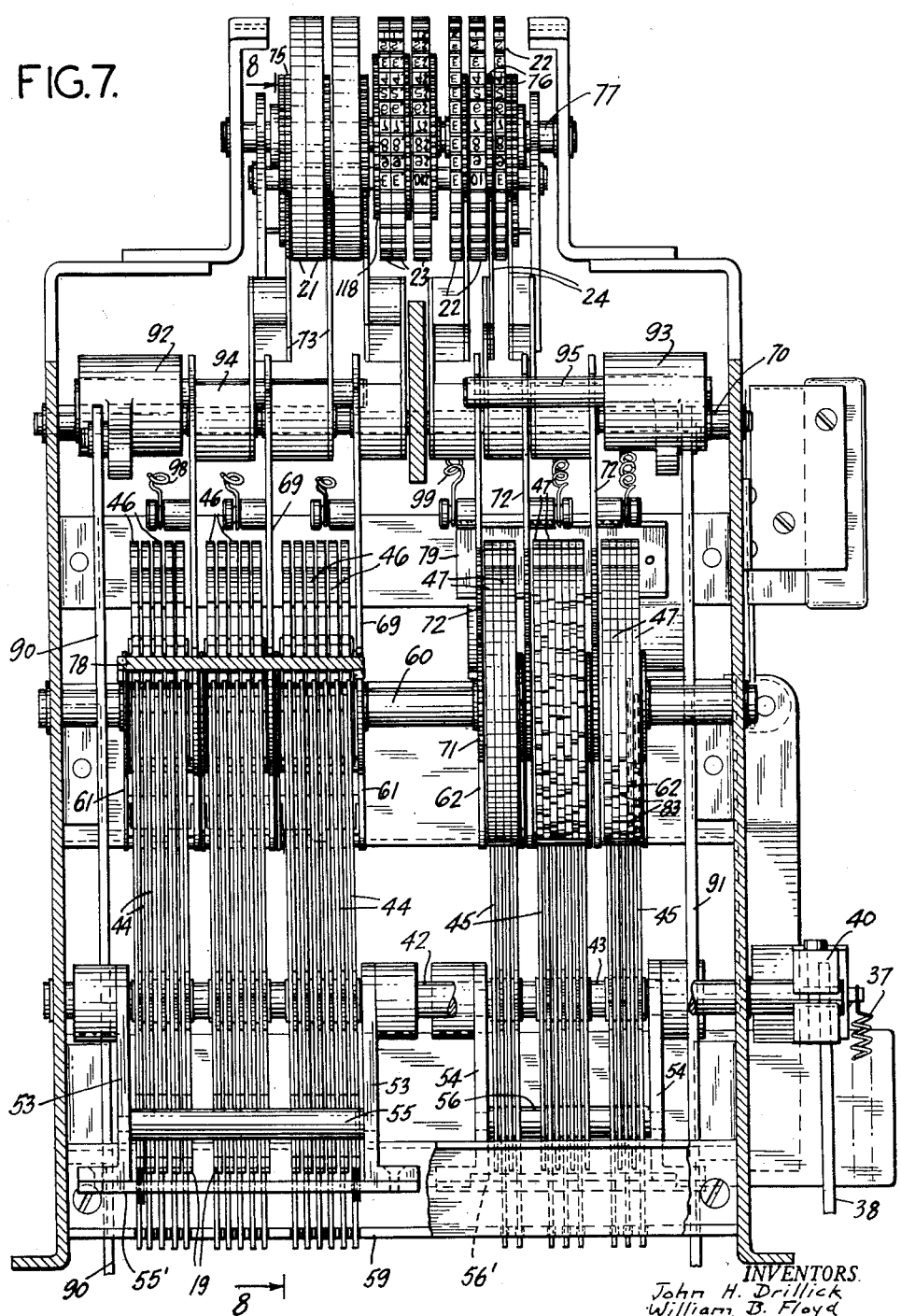
Fig. 7 is an enlarged front elevation of the computing mechanism, partly in section.

Similarly the set of disks 46 which registers the computed total price are divided into three groups which are adapted to register, from left to right in Fig. 7, units, tens and hundreds, the sixth disk being required in the hundreds group because in some cases extra positions are required.

Each group of permutation disks in set 46 is provided with a separate pawl bail 61 and each group of disks in set 47 is provided with a separate pawl bail 62. All of the pawl bails are mounted on shaft 60. The pawls 63 of each bail are pivoted at 64 and are biased toward the permutation disks by springs 65. Rods 66 extend transversely of the bails for engagement by detent 67 carried by each of the permutation disks. Each of the pawl bails 61 is provided with teeth 68 which mesh with a gear segment 69 mounted on shaft 70 and each of the pawl bails 62 is provided with teeth 71 which mesh with a gear segment 72 on shaft 70. Each of the segments 69 and 72 is rigidly connected to a corresponding segment of sets 73, 74, respectively, which operate sets of printing wheels 21, 22 through gears 75, 76, respectively, as hereinafter described, all of said printing wheels and gears being carried on shaft 77.

The permissible motion of the permutation wheels 46, 47 is limited by stop flanges 78, 79 which enter notches 80 in the permutation disks. The disks are normally biased in clockwise direction, Figs. 8 and 9, by springs 81 but are normally held in the position shown in Fig. 8 by rods 66 on the pawl bails. As soon as a pawl bail moves in clockwise direction, as shown in Fig. 9, however, the individual disks of the group controlled thereby are free to turn under influence of springs 81. Each disk will turn until the shoulder 82′ of notch 82 is intercepted by finger 57 of any pawl whose corresponding sensing pin has found a hole in the disk, or until the shoulder 80′ of notch 80 is intercepted by a stop flange.

As will be understood, the relative motion of the individual permutation disks of any group will cause selected permutation notches 83 of all of the disks of the group to align themselves, so that as the pawl bail moves in clockwise direction the pawl 63 may drop into the slot formed thereby, as shown in Fig. 9. When the pawl drops into a slot, it prevents further motion of the pawl bail, thereby controlling the extent of movement of the corresponding printing wheel.

Rotation of the pawl bails 61, 62 is produced as follows. Main shaft 33 carries a cam 85 (Fig. 4) which is engaged by roller 86 on arm 87. The arm is secured to shaft 88 carrying arms 89 connected to links 90, 91 which, in turn, are connected to bails 92, 93 mounted on shaft 70, said bails carrying rods 94, 95 which engage detents 96, 97 of gear segments 69 and 72, respectively. When the links 90, 91 move upwardly (Fig. 2) as the roller 86 approaches the low spot in the cam 85, the bails 92, 93 (Fig. 7) rock on the shaft 70, moving the rods 94, 95 away from the detents 96, 97 to allow the gear segments to move under the influence of springs 98, 99. This, in turn, moves the pawl bails until the pawls drop into aligned notches 83. When this occurs further motion of the respective pawl bails is arrested. Thus, as shown in Figs. 9 and 9B, the motion of the pawl bail has been arrested at a position to bring the numeral "6" of the printing wheel to printing position.

In the same manner, all of the printing wheels of both sets 21, 22 are actuated to set up in printing position the printing information indicated by the position of the disks 4 and 5 and transmitted through the parts shown in Figs. 8 and 9 under control of the sensing pins 19, 20.

At any time when it may be necessary to change price disk 4 to indicate a different price per pound, it is desirable to set the price per pound printing wheels 23 and lock the same to cause the proper price per pound to be printed on each label issued while said disk remains in the machine.

The disk 4 is preferably located behind a door 101 (Fig. 1) which is hinged to the casing at 102. A backing member 103 which lies in front of the front face of the disk 4 in the region of the sensing pins is pivoted to the frame at 104 and is connected to the door 101 by a link 105 mounted on a slide 106. The backing member is intended merely to prevent warping of the disk 4 when engaged by the sensing pins. When the door is opened, the backing member 103 is swung away from the disk so that it will be out of the way of the disk which is to be removed from the spindle 1.

Figure 2:
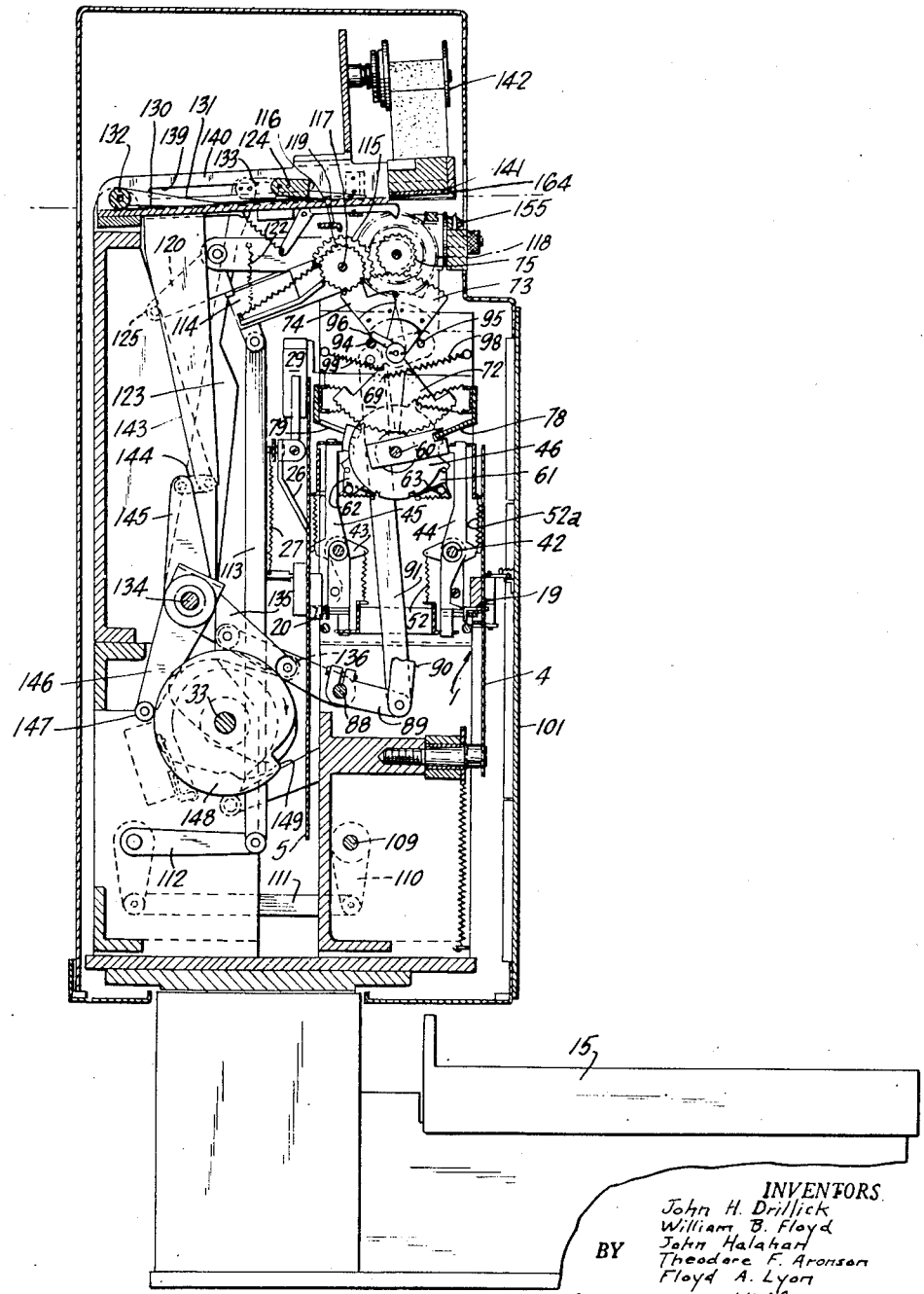
Fig. 2 is a section on the line 2—2 of Fig. 1.
Figure 3:
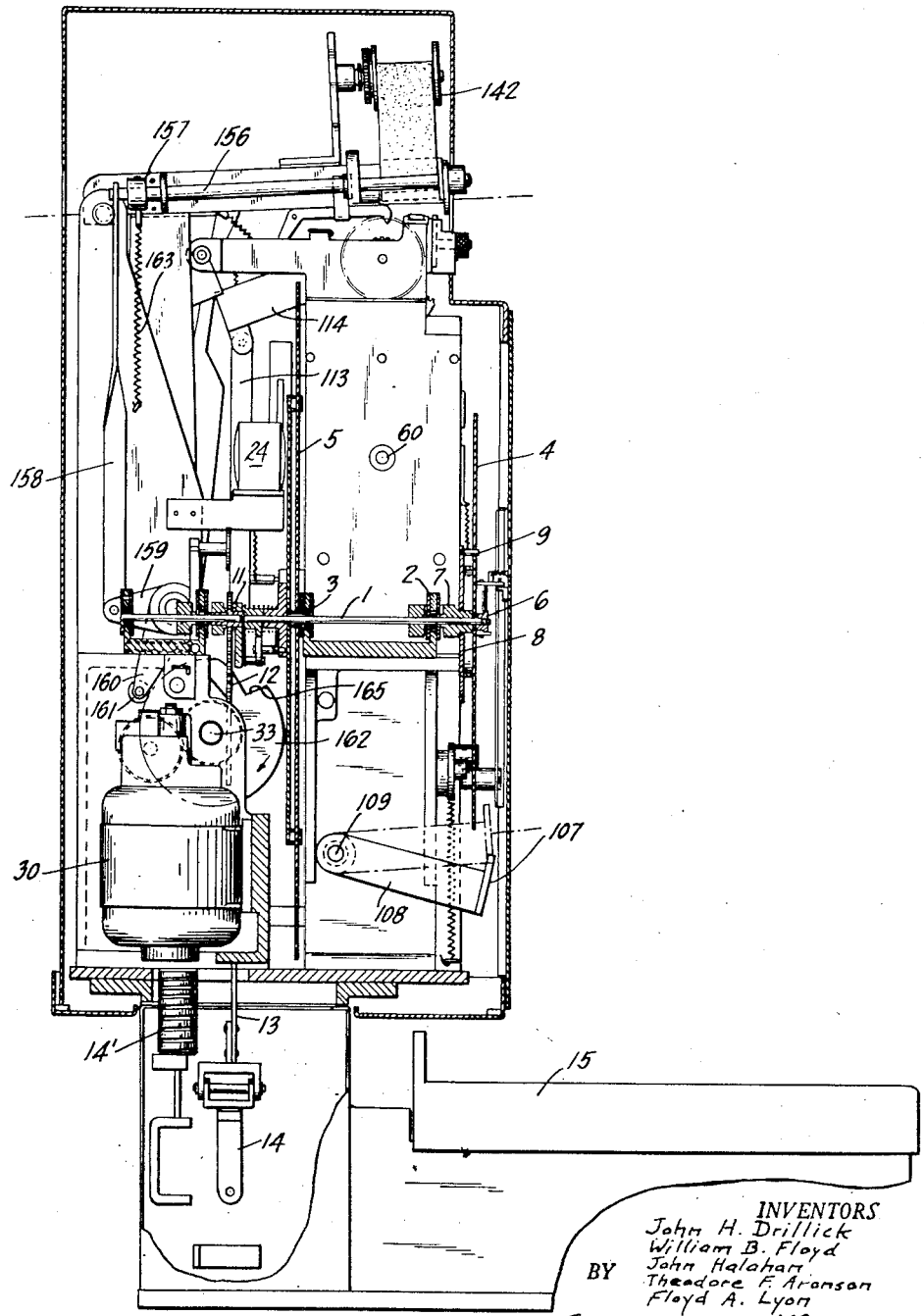
Fig. 3 is a similar section on the line 3—3 of Fig. 1.

The disk 4 is also retained on the spindle by arm 107 of lever 108 (Fig. 3). When it is desired to remove a disk, therefore, it is necessary to swing the arm and lever down to clear the disk. The arm is mounted on shaft 109 which carries arm 110, connected by link 111 to bell crank 112 which, in turn, is connected by link 113 to a frame 114 (Figs. 2 and 10) which is pivoted on the printing wheel shaft 77. The frame 114 carries two sets of gears 115 and 116 arranged coaxially on shaft 117 with the outside gear 115a connected to and rotating with outside gear 116a, with middle gear 115b connected to and rotating with middle gear 116b and with inside gear 115c connected to and rotating with inside gear 116c. Each of the gears 116 meshes with one of the gears 118 which are secured to the price per pound printing wheels 23, so that rotation of gear 115a, for example, will rotate gear 116a to rotate its respective gear 118 and printing wheel 23.

In the ordinary operation of the machine, the frame 114 is swung upwardly from the position shown in Figs. 2 and 10 so that the gears 115 are in engagement with the latch 119 which locks gears 116, 118 and the price per pound printing wheels in fixed position. When the door 101 is opened and the lever 108 is swung downwardly to clear the disk, the link 113 is moved downwardly to bring the gears 116 into position to be engaged by the segments 73. At the same time all of the gears 114, 115 and their corresponding printing wheels 23 are restored to blank position by springs 115'. When the frame swings downwardly, the latch 120 which is pivoted at 121 swings in behind and over the rear corner of the frame 114 to hold it in its down position against the tension of spring 122. The frame remains latched in the position shown in Fig. 10 until after the disk has been changed, the door has been closed, and until near the end of the first operating cycle thereafter.

Meanwhile the opening of door 101 has caused the cam 124 (Fig. 5) carried thereby to release the lever 125, to permit the lever to swing upwardly under the influence of spring 126 to cause the pin 127 to engage the notch 8' of the disk 8. This centers and locks the disk 8 in the normal rest position, so that when a new price disk is inserted and properly located by pin 9, it will also be in normal rest position.

Each price disk 4 is provided with a radial line of code perforations which are aligned with the sensing pins when the scale platform is in its normal rest position, and which when sensed by the pins will transmit the coded information through the permutation disks 46 and segments 69 and 73, gears 115, 116 and 118 to rotate the price per pound printing wheels to positions to print the price per pound for which the particular disk is intended. At a point late in the operating cycle the arm 123 which actuates the label feed pawl 128 engages pin 129 to disengage latch 120 to allow frame 114 to swing upwardly, thereby disengaging gears 116 from segments 73 and causing gears 115 to engage latch 119, thus locking the price per pound printing wheels in position to print the same price per pound on each label printed until the price disk is changed again.

The labels to be printed are preferably in the form of a continuous strip S which extends across a table 130, being held against the table by arms 131 which are pivoted on spindle 132. The label strip may be provided with suitable notches, perforations or the like which are adapted to be engaged by a feed pawl having a stroke sufficient to advance the strip intermittently one tag length at a time. The feed pawl 128 is pivotally mounted on a reciprocating carriage 128' which is pivotally connected to arm 123 by link 133. Arm 123 is pivotally mounted on a shaft 134 and is rigidly connected with a depending arm 135 having a roller 136 engaging cam 137 on main shaft 33.

The feed pawl carriage 133 slides in slots 139 in the platen frame 140 which is also pivoted on spindle 132. The platen frame carries a platen 141 which is located above and in position to engage the top of the printing wheels 21, 22, 23. Above the platen is an ink ribbon carrier 142 of any desired type. The carrier illustrated herein is adapted to feed the ribbon R automatically as the machine operates, but will not be described in detail herein as it forms no part of the present invention.

The platen frame has a depending arm 143 connected by a link 144 to an arm 145 which is mounted on shaft 134. Arm 145, in turn, is rigidly connected to arm 146 which carries a roller 147 which engages cam 148 on main shaft 33. The platen frame is held out of engagement with the printing wheels during the first part of the cycle of operation while the printing wheels are being set, but at the proper time, roller 147 drops off the shoulder 149 of the cam, allowing the platen frame to drop so that the platen may strike the print wheels to cause a printing impression on the label. A ribbon mask in the form of a thin plate 150, attached to the front edge of the table 130 is provided with apertures 150a and 150b at the printing positions.

A series of pawls 151 pivoted on a spindle 152 carried on the platen frame beneath the table 130 are arranged to engage the printing wheel gears 75 and 76 as the platen frame drops to printing position so as to lock the printing wheels during the printing operation. The pawls are normally held in engagement with the bar 153 by springs 154.

An oscillating knife 155 is mounted on the front end of a shaft 156, the rear end of which carries an arm 157 connected to a link 158. The link is connected to arm 159 of a crank mounted on shaft 134, the other arm 160 having a roller 161 which engages cam 162. Spring 163 attached to arm 157 normally tends to swing knife 155 upwardly into shearing relation with fixed knife 164. Toward the end of the operating cycle, after the printing operation has been completed, the roller 161 drops off of the shoulder 165, to allow the spring to operate the knife.

On completion of the operating cycle, the operation of the machine is stopped by a switch 166 having an arm and roller 167 engaging cam 34.

We have heretofore referred to the fact that it is only possible to place lines of perforations on a single disk 4 to represent costs calculated for one price per pound only. Even then, in cases where it is desired to record very small increments of weight, it is difficult to drill adjacent radial lines of perforations without unduly weakening the disk. To overcome this difficulty, the perforations of successive radial lines may be staggered, as shown in Fig. 14. Thus, the perforations of radial lines X are offset radially from the corresponding perforations of lines Y. The reasons for the use of two sensing pins 19 and two pawls 44 for each of the permutation wheels of series 46 will now be clear. One set of sensing pins will sense the perforations which occupy the positions of line X. The other set will sense the perforations which occupy the positions of line Y. But in each case, any combination of disk perforations of line X which will operate one set of pins and pawls to set the permutation disks for the numeral "5," for example, will, when offset as in line Y, operate the other set of pins and pawls to again set the permutation disks for the numeral "5."

A useful printing accessory for the machine is the removable type bar 170 which is grooved to slide on flanges 171 of the frame, said type bars being located near the printing wheels and in position to be engaged by the platen when the platen frame descends. The type bars may be printed with legends such as "Veal" or "Lamb chops" or "Hamburger" to indicate on the label the contents of the package.

Also, the machine may also be provided with one or more type wheels 173 and 174 rotatably mounted on shafts 175 and 176 carrying knurled nuts 177 and 178 by which the wheels may be turned. The wheels are mounted so that their upper peripheral edges are in position to be engaged by the platen when the platen frame descends. One of these wheels may be provided with a series of numerals or characters to indicate the person who weighed the package. The other wheel may be provided with a series of numbers or characters to indicate a date or any other information which it may be desired to print on the labels.

It will be understood that the invention may be variously modified and embodied within the scope of the subjoined claims.

We claim as our invention:

1. In a recording scale, in combination, a printing wheel having a series of digits thereon, a platform movable in accordance with the weight to be weighed, an indicator member connected to said platform and movable therewith and having a group of code perforations therein consisting of a series of separate lines of perforations in which the perforations of each line represent a digit, a group of independently movable sensing pins for sensing individual perforations of the lines of the group, means for moving said group of sensing pins into sensing position and means controlled by the relative movement of said independently movable sensing pins after said group is moved into sensing position for setting the digit printing position of said printng wheel in accordance with the positions of the perforations entered by the individual pins of the group, said printing wheel setting means including a group of pawls including one pawl for each sensing pin, with each pawl in position to be controlled by its respective pin, a group of permutation disks including one permutation disk for each pawl and sensing pin, and means for causing those pawls whose corresponding sensing pins have found perforations in said indicator member to engage their respective permutation disks.

2. Apparatus as claimed in claim 1, in which said printing wheel setting means includes means to cause rotation of all of the permutation disks of the group after engagement of certain of said disks by said pawls, with the rotation of those disks which have been engaged by pawls being different in extent from the rotation of those disks which have not been engaged by pawls.

3. Apparatus as claimed in claim 1, in which said printing wheel setting means includes means to cause rotation of all of the permutation disks of the group after engagement of certain of said disks by said pawls, with the rotation of those disks which have been engaged by pawls being different in extent from the rotation of those disks which have not been engaged by pawls, and means movable relative to said group of permutation disks to an extent determined by the relative rotation between individual disks of the group, said means being connected to a printing wheel and rotating said wheel a corresponding extent.

4. Apparatus as claimed in claim 1, in which each combination of code perforations which taken together represents a digit is located in a line, and in which code perforations of successive lines of one of said groups of perforations are staggered, with the code perforation positions of each line offset to lie approximately midway between the code perforation positions of the next adjacent line on either side thereof, and in which each of said groups of sensing pins includes duplicate sets to sense said staggered lines of code perforations, and in which said printing wheel setting means includes a group of pawls including one pawl for each sensing pin of both sets with each pawl in position to be controlled by its respective pin, a group of permutation disks including one permutation disk for each pair of pawls and sensing pins, and means for causing either of the pawls of any pair whose corresponding sensing pin has found a perforation in said indicator member to engage its respective permutation disk.

5. In a recording scale, in combination, a plurality of printing wheels constituting a group in which each wheel prints one or more digits which together represent a total value, a platform movable in accordance with the weight to be weighed, an indicator member connected to said platform and movable therewith and having a plurality of separate groups of code perforations therein equal in number to the number of printing wheels of the group, a plurality of groups of independently movable sensing pins for sensing individual perforations of each of said separate groups of code perforations, means for moving each of said pins independently into yielding engagement with said indicator member, and means controlled separately by each of said groups of sensing pins for setting the digit printing positions of each of said printing wheels separately in accordance with the perforations sensed by the individual pins of each group, each of said printing wheel setting means including a group of pawls including one pawl for each sensing pin, with each pawl in position to be controlled by its respective pin, a group of permutation disks including one permutation disk for each pawl and sensing pin, and means for causing those pawls whose corresponding sensing pins have found perforations in said indicator member to engage their respective permutation disks.

6. In a recording scale, in combination, a plurality of printing wheels constituting a group in which each wheel prints one or more digits which together represent a total value indicating weight, a second plurality of printing wheels constituting a second group in which each wheel prints one or more digits which together represent a total value indicating total cost, a platform movable in accordance with the weight to be weighed, two indicator members connected to said platform and movable therewith, each indicator member having a plurality of separate groups of code perforations therein equal in number to the number of printing wheels of one of the groups, the code perforations of one of said indicator members being arranged in lines representing increments of weight, the code perforations of the other of said indicator members being arranged in lines representing increments of total cost, a plurality of groups of sensing pins for sensing each of said separate groups of code perforations of each indicator member, means for bringing all of said groups of sensing pins into engagement with their respective indicator members, and means controlled separately by each of said groups of sensing pins for setting the printing positions of each of the printing wheels of each group separately to print weight and total cost information.

7. In a recording scale, in combination, a plurality of printing wheels constituting a group in which each wheel prints one or more digits which together represent a total value indicating total cost, a second plurality of printing wheels constituting a second group in which each wheel prints one or more digits which together represent a total value indicating price per unit of weight, a platform movable in accordance with the weight to be weighed, an indicator member connected to said platform and movable therewith and having a plurality of separate groups of code perforations therein equal in number to the number of printing wheels of the first group, a plurality of groups of sensing pins for sensing each of said separate groups of code perforations, means for bringing said groups of sensing pins into engagement with said indicator member, means controlled separately by each of said groups of sensing pins for setting the printing positions of each of the printing wheels of the total cost group separately, and means for connecting the individual printing wheels of the price per unit of weight group with the means for setting the corresponding individual printing wheels of the total cost group so that individual printing wheels of both groups may be set together.

8. Apparatus as claimed in claim 7, in which said connecting means includes an arm which is movable by the operator.

9. Apparatus as claimed in claim 7, in which said connecting means includes an arm which is movable by the operator, a latch to hold the parts in connected position until a portion of the next cycle of operation of the machine has been completed, and means to release said latch automatically during said next cycle.

References Cited in the file of this patent
UNITED STATES PATENTS

| | | |
|---|---|---|
| 1,299,786 | Schantz | Apr. 8, 1919 |
| 1,338,282 | Boyer | Apr. 27, 1920 |
| 2,163,183 | Baagoe | June 20, 1940 |
| 2,214,720 | Brockere | Sept. 10, 1940 |
| 2,382,752 | Toth | Aug. 14, 1945 |
| 2,390,482 | Williams | Dec. 4, 1945 |